US008639664B2

(12) United States Patent
Weber et al.

(10) Patent No.: US 8,639,664 B2
(45) Date of Patent: Jan. 28, 2014

(54) CONCEPTS FOR VIEWING AND ACCESSING CLAIM VERSIONS

(75) Inventors: Tracy Ann Weber, Southbury, CT (US); Mark Galik, Malvern, PA (US); Christine Belanger, Wilton, CT (US)

(73) Assignee: McKesson Financial Holdings

( * ) Notice: Subject to any disclaimer, the term of this patent is extended or adjusted under 35 U.S.C. 154(b) by 0 days.

(21) Appl. No.: 13/434,367

(22) Filed: Mar. 29, 2012

(65) Prior Publication Data

US 2013/0262441 A1  Oct. 3, 2013

(51) Int. Cl.
*G06F 17/30* (2006.01)

(52) U.S. Cl.
USPC ........... 707/638; 707/695; 707/714; 715/203; 715/223; 715/229; 705/5

(58) Field of Classification Search
USPC ......... 707/638, 639, 695, 610, 611, 683, 684, 707/714, 999.203, 999.008; 715/229, 203, 715/FOR. 221, 221, 222, 223, 224, 225; 705/4; 714/775, 789, 798
See application file for complete search history.

(56) References Cited

U.S. PATENT DOCUMENTS

| | | | |
|---|---|---|---|
| 7,028,057 B1 * | 4/2006 | Vasudevan et al. ........... | 707/695 |
| 7,263,493 B1 * | 8/2007 | Provost et al. ................ | 705/4 |
| 7,346,523 B1 * | 3/2008 | Provost et al. ................ | 705/4 |
| 7,730,450 B2 * | 6/2010 | Mercer .......................... | 707/683 |
| 7,735,062 B2 * | 6/2010 | de Seabra e Melo et al. | 707/695 |
| 2003/0177362 A1 * | 9/2003 | Wouters et al. ................ | 705/57 |
| 2005/0278270 A1 * | 12/2005 | Carr et al. ..................... | 706/25 |
| 2006/0036656 A1 * | 2/2006 | Mercer .......................... | 707/203 |
| 2006/0212487 A1 * | 9/2006 | Kennis et al. ................. | 707/200 |
| 2009/0313309 A1 * | 12/2009 | Becker et al. ................. | 707/203 |
| 2010/0042605 A1 * | 2/2010 | Cheng et al. .................. | 707/4 |
| 2010/0088277 A1 * | 4/2010 | Rao et al. ...................... | 707/637 |
| 2010/0211412 A1 * | 8/2010 | Tholl et al. .................... | 705/4 |
| 2011/0071858 A1 * | 3/2011 | Keefer ........................... | 705/4 |
| 2013/0151941 A1 * | 6/2013 | Galassi ........................... | 715/229 |

OTHER PUBLICATIONS

Medicar Alert "Medicare Bulltin # 2057"—Medicare Part A—Apr. 7, 2003—www.georgiamedicare.com—p. 1-78.*
Guo et al.—"CLAIM (Clinical Accounting Information)—An XML-Based Data Exchange Standard Connecting Electronic Medical Record Systems to Patient Accounting Systems"—Journal of Medical Systems, vol. 29, issue 4, Aug. 2005, (pp. 413-423).*

* cited by examiner

*Primary Examiner* — Jean B Fleurantin
*Assistant Examiner* — Anh Ly
(74) *Attorney, Agent, or Firm* — Alston & Bird LLP

(57) ABSTRACT

Systems, methods, apparatus, and computer program products are provided for accessing, navigating, and displaying multiple versions of claims in an efficient and customer-friendly manner. In various embodiments, claims can be processed and stored such that they can be displayed via an interface in a graphical format (e.g., textual, circular, hierarchical, etc.).

36 Claims, 14 Drawing Sheets

| Ext. Claim ID | Int. Claim ID | Claim Name | Date Created | Related Int. Claim ID | Current Claim | Member ID |
|---|---|---|---|---|---|---|
| 111098467234 | ACF4203 | Original Claim | 2013-12-14 12:00:00 | | N | 1234567 |
| 111098467234 | ACF4204 | Internal Claim | 2013-12-14 12:01:00 | ACF4203 | N | 1234567 |
| 111098467234 | ACF4985 | Internal Claim | 2013-12-17 15:54:32 | ACF4204 | N | 1234567 |
| 111098467234 | ACF5001 | Internal Claim | 2013-12-17 17:00:00 | ACF4985 | N | 1234567 |
| 111098467234 | ACF5954 | Replaced Claim | 2013-12-22 15:30:00 | | N | 1234567 |
| 111098467234 | ACF5955 | Internal Claim | 2013-12-22 15:31:00 | ACF5954 | N | 1234567 |
| 111098467234 | ACF6007 | Internal Claim | 2013-12-27 13:20:02 | ACF5955 | N | 1234567 |
| 111098467234 | ACF6112 | Reversed Claim | 2014-01-03 11:00:00 | | N | 1234567 |
| 111098467234 | ACF6452 | Replaced Claim | 2014-01-05 11:00:00 | | N | 1234567 |
| 111098467234 | ACF6184 | Internal Claim | 2014-01-05 14:01:00 | ACF6452 | N | 1234567 |
| 111098467234 | ACF6185 | Internal Claim | 2014-01-05 14:02:00 | ACF6184 | Y | 1234567 |
| PROF01 | BXW6894 | Original Claim | 2014-01-27 12:59:43 | | N | P1234567 |
| PROF01 | BXW6895 | Internal Claim | 2014-01-27 12:59:43 | BXW6894 | Y | P1234567 |

| Ext. Claim ID | Int. Claim ID | Claim Name | Date Created | Related Int. Claim ID | Current Claim | Member ID |
|---|---|---|---|---|---|---|
| 111098467234 | ACF4203 | Original Claim | 2013-12-14 12:00:00 | | Y | 1234567 |
| PROF01 | BXW6894 | Original Claim | 2014-01-27 12:59:43 | | Y | P1234567 |

Fig. 4

| Ext. Claim ID | Int. Claim ID | Claim Name | Date Created | Related Int. Claim ID | Current Claim | Member ID |
|---|---|---|---|---|---|---|
| 111098467234 | ACF4203 | Original Claim | 2013-12-14 12:00:00 | | N | 1234567 |
| 111098467234 | ACF4204 | Internal Claim | 2013-12-14 12:01:00 | ACF4203 | Y | 1234567 |
| PROF01 | BXW6894 | Original Claim | 2014-01-27 12:59:43 | | N | P1234567 |
| PROF01 | BXW6895 | Internal Claim | 2014-01-27 12:59:43 | BXW6894 | Y | P1234567 |

Fig. 5

| Ext. Claim ID | Int. Claim ID | Claim Name | Date Created | Related Int. Claim ID | Current Claim | Member ID |
|---|---|---|---|---|---|---|
| 1110984467234 | ACF4203 | Original Claim | 2013-12-14 12:00:00 | | N | 1234567 |
| 1110984467234 | ACF4204 | Internal Claim | 2013-12-14 12:01:00 | ACF4203 | N | 1234567 |
| 1110984467234 | ACF4985 | Internal Claim | 2013-12-17 15:54:32 | ACF4204 | N | 1234567 |
| 1110984467234 | ACF5001 | Internal Claim | 2013-12-17 17:00:00 | ACF4985 | N | 1234567 |
| 1110984467234 | ACF5954 | Replaced Claim | 2013-12-22 15:30:00 | | N | 1234567 |
| 1110984467234 | ACF5955 | Internal Claim | 2013-12-22 15:31:00 | ACF5954 | N | 1234567 |
| 1110984467234 | ACF6007 | Internal Claim | 2013-12-27 13:20:02 | ACF5955 | N | 1234567 |
| 1110984467234 | ACF6112 | Reversed Claim | 2014-01-03 11:00:00 | | N | 1234567 |
| 1110984467234 | ACF6452 | Replaced Claim | 2014-01-05 11:00:00 | ACF6452 | N | 1234567 |
| 1110984467234 | ACF6184 | Internal Claim | 2014-01-05 14:01:00 | ACF6184 | Y | 1234567 |
| 1110984467234 | ACF6185 | Internal Claim | 2014-01-05 14:02:00 | | N | 1234567 |
| PROF01 | BXW6894 | Original Claim | 2014-01-27 12:59:43 | | N | P1234567 |
| PROF01 | BXW6895 | Internal Claim | 2014-01-27 12:59:43 | BXW6894 | Y | P1234567 |

CONCEPTS FOR VIEWING AND ACCESSING CLAIM VERSIONS

BACKGROUND

Generally, claims systems are very complex. For example, claims payment systems often process a high volume of claims in accordance with dynamic medical policies, payment policies, contract terms, and benefit plans. Accordingly, processing claims can be equally complex and result in various claim versions that end with a claim being modified, denied, or paid. Thus, a need exists for accessing, navigating, and displaying multiple versions and iterations of claims and information about those claim versions in an efficient and customer-friendly manner.

BRIEF SUMMARY

In general, embodiments of the present invention provide systems, methods, apparatus, and computer program products for accessing, navigating, and displaying multiple versions of claims in an efficient and customer-friendly manner.

In accordance with one aspect, a method is provided. In one embodiment, the method comprises (1) receiving a claim; (2) storing the claim (a) as a first version of the claim, (b) in association with a date and a time, (c) in association with an external claim identifier, and (d) in association with a first internal claim identifier corresponding to the first version of the claim; (3) processing the claim in accordance with one or more claims processing rules; and (4) storing the processed first version of the claim as a second version of the claim, wherein the second version of the claim is stored in association with (a) a date and a time the first version of the claim was processed, (b) the external claim identifier, and (c) the first internal claim identifier corresponding to the first version of the claim.

In accordance with another aspect, a computer program product is provided. The computer program product may comprise at least one computer-readable storage medium having computer-readable program code portions stored therein, the computer-readable program code portions comprising executable portions configured to (1) receive a claim; (2) store the claim (a) as a first version of the claim, (b) in association with a date and a time, (c) in association with an external claim identifier, and (d) in association with a first internal claim identifier corresponding to the first version of the claim; (3) process the claim in accordance with one or more claims processing rules; and (4) store the processed first version of the claim as a second version of the claim, wherein the second version of the claim is stored in association with (a) a date and a time the first version of the claim was processed, (b) the external claim identifier, and (c) the first internal claim identifier corresponding to the first version of the claim.

In accordance with yet another aspect, an apparatus comprising at least one processor and at least one memory including computer program code is provided. In one embodiment, the at least one memory and the computer program code may be configured to, with the processor, cause the apparatus to at least (1) receive a claim; (2) store the claim (a) as a first version of the claim, (b) in association with a date and a time, (c) in association with an external claim identifier, and (d) in association with a first internal claim identifier corresponding to the first version of the claim; (3) process the claim in accordance with one or more claims processing rules; and (4) store the processed first version of the claim as a second version of the claim, wherein the second version of the claim is stored in association with (a) a date and a time the first version of the claim was processed, (b) the external claim identifier, and (c) the first internal claim identifier corresponding to the first version of the claim.

In accordance with still another aspect, a method is provided. In one embodiment, the method comprises (1) receiving a first version of a claim; (2) storing the first version of the claim in association with (a) a date and a time, (b) an external claim identifier, and (c) a first internal claim identifier corresponding to the first version of the claim; (3) receiving a second version of the claim; and (4) storing the second version of the claim in association with (a) a date and a time, (b) the external claim identifier, and (c) a second internal claim identifier corresponding to the second version of the claim.

In accordance with another aspect, a computer program product is provided. The computer program product may comprise at least one computer-readable storage medium having computer-readable program code portions stored therein, the computer-readable program code portions comprising executable portions configured to (1) receive a first version of a claim; (2) store the first version of the claim in association with (a) a date and a time, (b) an external claim identifier, and (c) a first internal claim identifier corresponding to the first version of the claim; (3) receive a second version of the claim; (4) store the second version of the claim in association with (a) a date and a time, (b) the external claim identifier, and (c) a second internal claim identifier corresponding to the second version of the claim.

In accordance with yet another aspect, an apparatus comprising at least one processor and at least one memory including computer program code is provided. In one embodiment, the at least one memory and the computer program code may be configured to, with the processor, cause the apparatus to at least (1) receive a first version of a claim; (2) store the first version of the claim in association with (a) a date and a time, (b) an external claim identifier, and (c) a first internal claim identifier corresponding to the first version of the claim; (3) receive a second version of the claim; (4) store the second version of the claim in association with (a) a date and a time, (b) the external claim identifier, and (c) a second internal claim identifier corresponding to the second version of the claim.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4-14 show exemplary input and output that can be used in accordance with various embodiments of the present invention.

DETAILED DESCRIPTION

Figure 1:
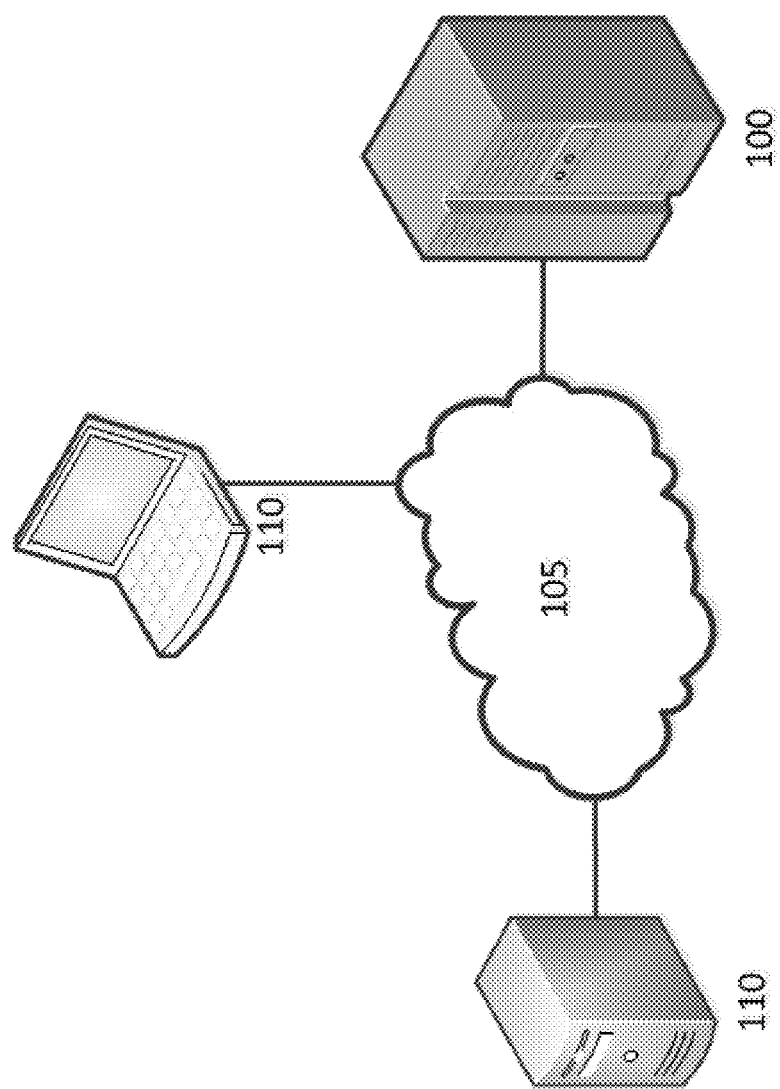
FIG. 1 is an overview of a system according to various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, And Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more claims systems 100, one or more networks 105, and one or more customer computing entities 110. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

1. Exemplary Claims System

Figure 2:
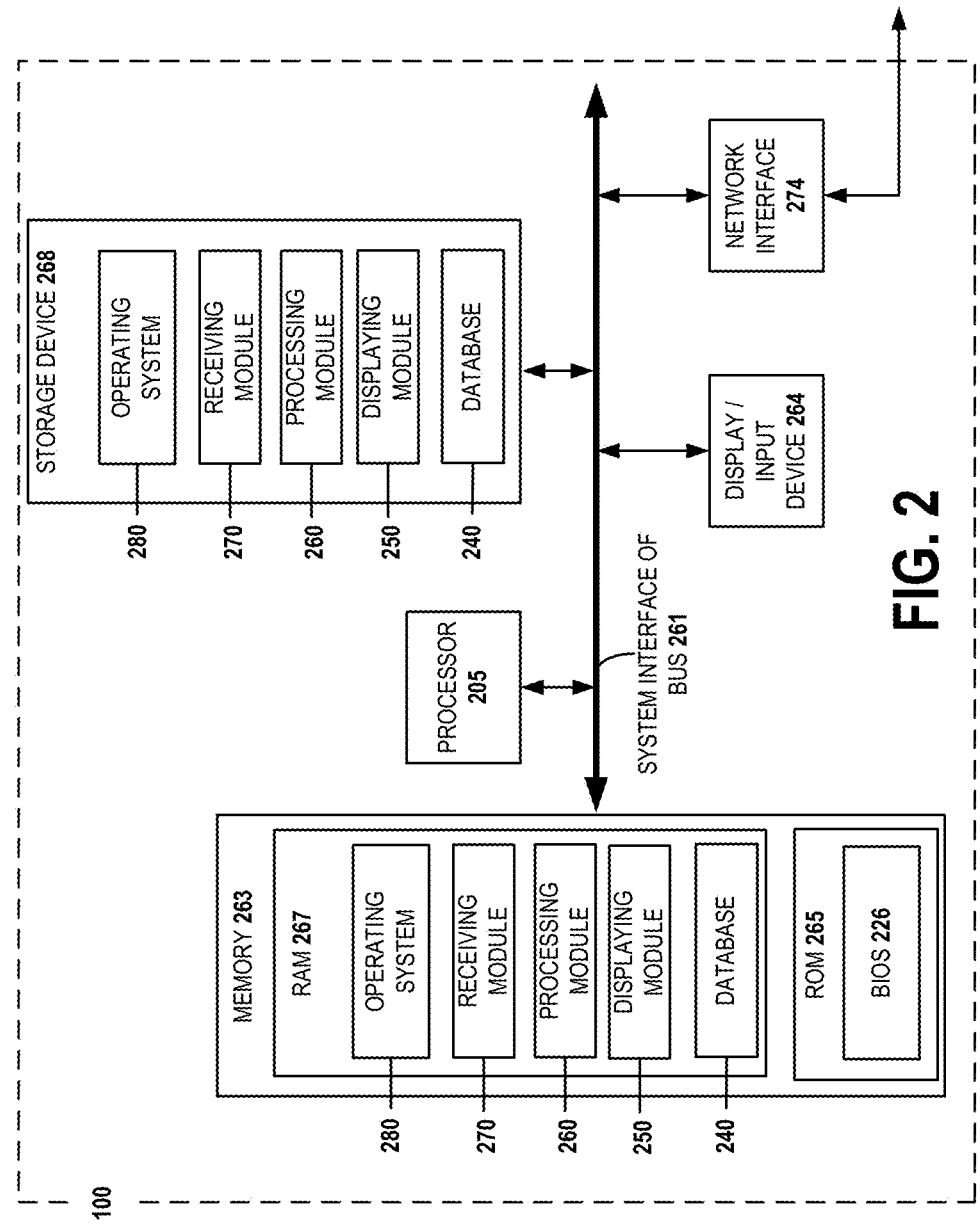
FIG. 2 is an exemplary schematic diagram of a claims system according to one embodiment of the present invention.

FIG. 2 provides a schematic of a claims system 100 according to one embodiment of the present invention. In general, the term "system" may refer to, for example, any computer, computing device, mobile phone, desktop, tablet, notebook or laptop, database management system, distributed system, server, blade, gateway, switch, processing device, or combination of processing devices adapted to perform the functions described herein.

As will be understood from FIG. 2, in one embodiment, the claims system 100 may include a processor 205 that communicates with other elements within the claims system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. For example, as discussed in more detail below, the claims system 100 may be configured, among other things, to process and analyze claims. A display/input device 264 for receiving and displaying data may also be included in (or in communication with) the claims system 100. This display device/input device 264 may be, for example, a keyboard or pointing device that is used in combination with a monitor (e.g., an electronic screen/display). The display/input device 264 may be a touchscreen that can detect the presence and location of a touch within the display area. The claims system 100 may further include transitory and non-transitory memory 263, which may include both random access memory (RAM) 267 and read only memory (ROM) 265. The claims system's ROM 265 may be used to store a basic input/output system (BIOS) 226 containing the basic routines that help to transfer information to the different elements within the claims system 100.

In addition, in one embodiment, the claims system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 268 may be connected to the system bus 261 by an appropriate interface.

Furthermore, a number of executable instructions, applications, scripts, program modules, and/or the like may be stored by the various storage devices 268 and/or within RAM 267. Such executable instructions, applications, scripts, program modules, and/or the like may include an operating system 280, a receiving module 270, a processing module 260, and a displaying module 250. As discussed in more detail below, these executable instructions, applications, program modules, and/or the like may control certain aspects of the operation of the claims system 100 with the assistance of the processor 205 and operating system 280—although their functionality need not be modularized. In addition to the program modules, the claims system 100 may store or be in communication with one or more databases, such as database 240 storing claims processing rules, claims, and/or other functionality that can be enabled and/or disabled.

Also located within the claims system 100, in one embodiment, is a network interface 274 for interfacing with various computing entities, including a print computing entity. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the claims system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA20001x (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the claims system's 100 components may be located remotely from other claims system 100 components. Furthermore, one or more of the components may be combined and additional components performing functions described herein may be included in the claims system 100.

2. Exemplary Customer Computing Entity

Embodiments of the present invention may involve the use of one or more customer computing entities 110. Generally, the term "computing entity" may refer to, for example, any computer, computing device, mobile phone, desktop, tablet, notebook or laptop, database management system, distributed system, server, blade, gateway, switch, processing device, or combination of processing devices adapted to perform the functions described herein. Further, the customer computing entity may refer to a computing entity associated with a doctor, a hospital, a pharmacy, an insurance provider, a care manager, and/or other healthcare-related entities or professionals.

As will be recognized, the customer computing entity 110 may include components similar to those described with regard to the claims system 100. For example, the customer computing entity 110 may comprise: (1) a processor that communicates with other elements via a system interface or bus; (2) a display device/input device; (3) memory including both ROM and RAM; (4) a storage device; and (5) a network interface. Similarly, a customer computing entity 110 may comprise executable instructions, applications, scripts, program modules, and/or the like. As will be recognized, these architectures are provided for exemplary purposes only and are not limited to the various embodiments.

III. Exemplary System Operation

Figure 3:
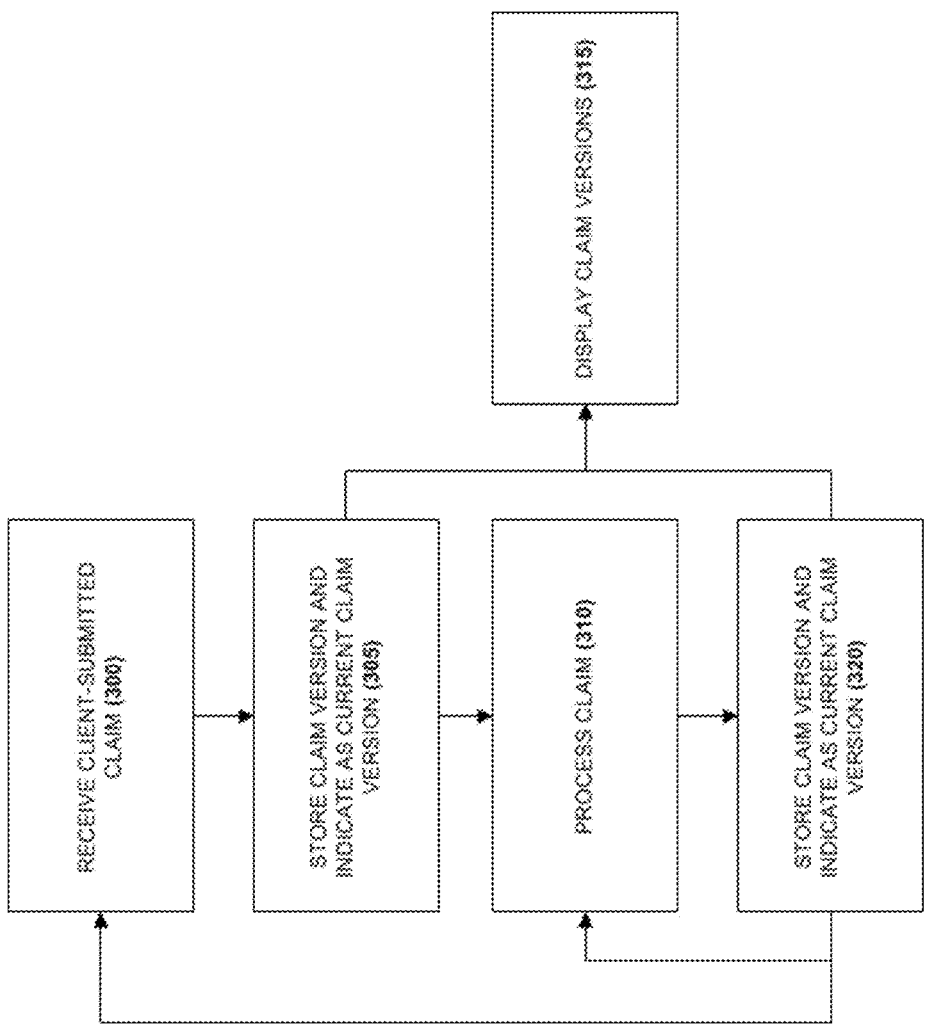
FIG. 3 is a flowchart illustrating operations and processes that can be used in accordance with various embodiments of the present invention.

Reference will now be made to FIGS. 3-14. FIG. 3 is a flowchart illustrating operations and processes that may be performed for accessing, navigating, and displaying multiple versions of claims in an efficient and customer-friendly manner. FIGS. 4-14 show exemplary input and output that can be used in accordance with various embodiments of the present invention.

1. Original Customer-Submitted Claims

In one embodiment, the process may begin at Block 300 of FIG. 3 with the claims system 100 receiving (e.g., via the receiving module 270) an original customer-submitted claim from a customer computing entity 110 (e.g., via a customer operating the same). An original customer-submitted claim may refer to the initial or first submission of a claim by a customer. As will be recognized, a claim may be a request for payment/reimbursement for services rendered, materials used, equipment provided, and/or the like. For example, a claim may be a request for payment/reimbursement for a consultation with a primary care doctor, a medical procedure or an evaluation performed by an orthopedic surgeon, a laboratory test performed by a laboratory, durable medical equipment provided to an injured patient, medications or other materials used in the treatment of a patient, and/or the like. As will be recognized though, embodiments of the present invention may be applied to a variety of other settings, such as automotive claims, repair claims, and/or the like.

In one embodiment, for each original customer-submitted claim received by the claims system 100, the claims system 100 can also receive a unique external claim identifier assigned to the claim. The external claim identifier can be used by a customer (e.g., operating a customer computing entity 110) to access the claim (see FIGS. 7 and 11). The claims system 100 can also assign a unique internal claim identifier to the claim. The internal claim identifier may be used by the claims system 100 to store certain versions of the claim in association with one another. As will be recognized, claim identifiers may be alphabetic, numeric, and/or alphanumeric characters and/or strings that can be used as keys (e.g., primary keys and foreign keys) of a database. For instance, FIG. 4 shows two original customer-submitted claims. The first original customer-submitted claim is assigned 111098467234 as the external claim identifier and ACF4203 as the internal claim identifier. The second original customer-submitted claim assigned PROF01 as the external claim identifier and BXW6894 as the internal claim identifier. After being assigned claim identifiers, the claims system 100 can store each claim as a record in a database (Block 305 of FIG. 3).

As part of storing a claim as a record (see FIG. 4), each record may include a claim version name field that indicates a textual description of the type of version of claim to which the record corresponds. The different claim version names or version types may include, for example, original customer-submitted claims, revised customer-submitted claims, replaced customer-submitted claims, paid customer-submitted claims, internal claims, and/or the like. The claims system 100 can populate the claim version name field with the appropriate information for each claim version. To do so, the claims system 100 can determine what name to associate with each version by, in part, determining whether any related claims are currently being stored for the corresponding external claim identifier. For instance, when the claims system 100 receives a customer-submitted claim with an external claim identifier of 111098467234, the claims system 100 can determine whether any claims exist with an external claim identifier of 111098467234. If no claim versions exist with the external claim identifier of 111098467234, the claims system 100 can populate the claim version name field with original customer-submitted claim—indicating that it is the first version of the claim. Additionally, the claims system 100 can time stamp the time the version was created, such as the time the original customer-submitted claim was created. As shown in FIG. 4, the original customer-submitted version of claim 111098467234 was received on Dec. 14, 2013, at 12:00:00 pm and time stamped as 2013-12-14 12:00:00. The original customer-submitted version of claim PROF01 was received on Jan. 27, 2014, at 12:59:43 pm and time stamped as 2014-01-27 12:59:43.

Further, as also shown in FIG. 4, the record for each claim may include a current claim field that can be populated with a "Y" or an "N." The current claim field can be used to indicate the most-recent version or current version of a claim. Thus, until an original customer-submitted claim is processed, its corresponding current version field can be populated with a "Y" indicating that the record is the most-recent version or current version of the claim. Once the claims system 100 processes the original customer-submitted claim in accordance with the appropriate claims processing rules, the claims system 100 may create/generate a new record for the processed version of the claim and populate the current claim field of the new record with a "Y." Correspondingly, the claims system 100 can then populate the current claim field in the record for the original customer-submitted claim that was just processed with an "N," indicating that it is no longer the current version of the claim. Thus, each time a new version (e.g., record) of a claim is created, the claims system 100 can update the appropriate current claim fields to indicate which record is the most-recent version or current version of the claim (Block 305 of FIG. 3).

Although not shown, in one embodiment, the record for each claim may also include information related to a claim header. An exemplary claim header is shown in FIGS. 8-10 and 12. As seen in these figures, the claim header may include information associated with the patient, such as the patient's name, identification number, date of birth, gender, address, medical record number, assigned physicians, and/or the like. The claim header may also include provider information, such as the provider's name, contract number, certifications, identification number, address, license numbers, and/or the like. In one embodiment, the claim header can be shown in a claim header panel that can be expanded and/or reduced.

In one embodiment, in addition to a claim header, the record for each claim may include information related to one or more lines of a claim. Exemplary claim lines are shown in FIGS. 8-10 and 12. As seen in these figures, a line may be a request for payment/reimbursement for services rendered, materials used, and/or equipment provided for one or more dates of service. Thus, each line may correspond to at least one code that is used to request payment/reimbursement for the corresponding service, material, and/or equipment. Such codes may be Current Procedural Terminology (CPT) codes, Healthcare Common Procedure Coding System (HCPCS) codes, and/or the like. By way of example, a patient may visit a doctor because of discomfort in his lower leg. During the visit, the doctor may examine the patient's lower leg, take an x-ray of the lower leg, and provide the patient with a compression stocking to wear on the lower leg as a result of the examination. An original customer-submitted claim from such a visit may have three lines with each line using a distinct billing code: billing code 99213; billing code 73590; and billing code A6542. Billing code 99213 may be used to request payment/reimbursement for the visit, examination, and evaluation of the patient. Billing code 73590 may be used to request payment/reimbursement for the x-ray of the leg. And billing code A6542 may be used to request payment/reimbursement for the compression stocking provided to the patient.

2. Processed Claims

In one embodiment, after receiving an original customer-submitted claim, the claims system 100 can process each line of the customer-submitted claim in accordance with various claims processing rules. Claims processing rules may be for pricing claims, scoring claims, auditing claims, bundling claims, and/or the like. Claims processing rules may also be for enforcing various policies, guidelines, requirements, contractual terms, and/or the like. For example, the claims processing rules may be used to enforce provisions of a provider's contract, contracted payment/reimbursement amounts, covered services and equipment of a benefit plan, copays, age limits, deductibles, and/or the like. To do so, there may be a set of claims processing rules for each provider, for each benefit plan, for certain services and/or equipment, for certain billing codes, combinations thereof, and/or the like.

In processing a claim, the claims system 100 (e.g., via the processing module 260) can apply the appropriate claims processing rules to create/generate a recommendation as to whether each line of a claim should be paid, denied, and/or modified (e.g., recommended for payment/reimbursement in a manner other than as requested). In one embodiment, the original customer-submitted claim (e.g., claim version) is never changed. Rather, each time a claim version is processed, a new version of the claim can be created/generated. The new claim version may include a recommendation or justification as to whether and how the claim should be paid, denied, or modified. As indicated, after processing the lines of an original customer-submitted claim, the claims system 100 can store the processed version of the original customer-submitted claim as a new record (Block 310 of FIG. 3). The claims system 100 can also populate the claim version name field for the processed version of the original customer-submitted claim with internal claim name. The new record for the processed version of the original customer-submitted claim may have the same external claim identifier as the original customer-submitted claim. However, the claims system 100 may also assign a unique internal claim identifier to the new record and store the same in the appropriate field. The claims system 100 may also store a time stamp of when the original customer-submitted claim was processed (e.g., in the date created field). Additionally, the claims system 100 may store the internal claim identifier of the original customer-submitted claim in the record for the processed version of the claim in the related internal claim identifier field. The claims system 100 can also update the current claim field to indicate that the new record is the most-recent version or current version of the claim (Block 320 of FIG. 3), while simultaneously removing the current claim field designation from the previous version. That is, only one claim version can be current at any time and there must be at least one.

Continuing with the above example, as shown in FIG. 5, the claims system 100 can process the first original customer-submitted claim (claim 111098467234; internal claim identifier ACF4203) in accordance with one or more claims processing rules (e.g., create/generate a recommendation to pay, deny, or modify the claim). In doing so, the claims system 100 can create a new record for the processed version of the original customer-submitted claim (e.g., including the recommendation)—the new record being assigned ACF4204 as the internal claim identifier. The claims system may populate the claim version name field with "internal claim" to indicate that the corresponding record is that of a processed claim version. The time stamp for the new record (internal claim identifier ACF4204) may be 2013-12-14 12:01:00, indicating that the original customer-submitted claim was processed by the claims system 100 on Dec. 14, 2013, at 12:01:00 pm. Further, in the new record (internal claim identifier ACF4204), the claims system 100 can populate the related internal claim identifier field with the internal claim identifier assigned to the original customer-submitted claim: ACF4203. By using the same external claim identifier for new record of the processed claim (external claim identifier 111098467234), the claims system 100 can identify and access all versions of the corresponding claim (claim 111098467234). And by storing the internal claim identifier assigned to the original customer-submitted claim (internal claim identifier ACF4203) in the related internal claim identifier field of the new record (internal claim identifier ACF4204), the two claim versions can be linked together in terms of their relationship to one another. Further, as shown in FIG. 5, the claims system 100 can update the two records (internal claim identifier ACF4203 and internal claim identifier ACF4204) to indicate that the record associated with internal claim identifier ACF4204 is now the most-recent version of current version of claim 111098467234.

Continuing to FIG. 6, the claims system 100 processes the claim version assigned internal claim identifier ACF4204 on 2013-12-17 15:54:32. The claims system 100 then stores the processed version as a record assigned internal claim identifier ACF4985. Similar to as described above, the claims system 100 then populates the related internal claim identifier field for the record assigned internal claim identifier ACF4985 with the internal claim identifier of the previous version (internal claim identifier ACF4204) and updates the current claim field by setting the ACF2985 entry with Y and simultaneously setting the ACF4204 to N. This process can be repeated as many times as necessary.

Similarly, the claims system 100 can process the second original customer-submitted claim (claim PROF01; internal claim identifier BXE6894) in accordance with one or more claims processing rules (e.g., create/generate a recommendation to pay, deny, or modify the claim). In doing so, the claims system 100 can create a new record for the processed version of the original customer-submitted claim (e.g., including the recommendation)—the new record being assigned BXW6895 as the internal claim identifier. The claims system 100 may populate the claim version name field with "internal claim" to indicate that the corresponding record is that of a processed claim version. The time stamp for the new record (internal claim identifier BXW6895) may be 2014-01-27 12:59:43. Further, in the new record (internal claim identifier BXW6895), the claims system 100 can populate the related internal claim identifier field with the internal claim identifier assigned to the original customer-submitted claim: BXW6894. By using the same external claim identifier for new record of the processed claim (external claim identifier PROF01), the claims system 100 can identify and access all versions of the corresponding claim (claim PROF01). And by storing the internal claim identifier assigned to the original customer-submitted claim (internal claim identifier BXW6894) in related internal claim identifier field of the new record (internal claim identifier BXW6895), the two claim versions can be linked together in terms of their relationship to one another. Further, as shown in FIG. 5, the claims system 100 can update the two records (internal claim identifier BXW6894 and internal claim identifier BXW6895) to indicate that the record associated with internal claim identifier BXW6895 is now the most-recent version or current version of claim PROF01.

As will be recognized, as shown in FIG. 6, each time the claims system 100 processes a version of a claim (such as original customer-submitted claim or a processed version of a claim), the described steps may be repeated. This allows for the relationship of the life cycle of a claim to be maintained.

3. Revised, Replaced, and Paid Customer-Submitted Claims

In one embodiment, when the claims system 100 receives a claim that it has "seen" before (e.g., based on the external claim identifier), it can store that customer-submitted claim as a replaced customer-submitted claim version, regardless of whether or not the content of the claim (e.g., the values in any of the claim fields) has changed. Additionally, the claims system 100 can also receive, store, and process revised customer-submitted claims, reversed customer-submitted claims, paid customer-submitted claims, and/or the like (Blocks 300, 305, 310, 320 of FIG. 3). For example, a revised customer-submitted claim may be a revised claim that is being submitted to correct the CPT codes or HCPCS codes submitted via the original customer-submitted claim. Similarly, a replaced customer-submitted claim may be a replacement claim that is being submitted to replace the original customer-submitted claim. And finally, a paid customer-submitted claim may reflect how the claim was actually paid/reimbursed. As will be recognized, for a given claim, each revised, replaced, and paid customer-submitted claim may use a common claim header and external claim identifier. Further, the claims system 100 can store each customer-submitted claim as an individual record as described above with regard to the original customer-submitted claim. Also, as has been previously described, these customer-submitted versions (replaced, revised, reversed, or paid) can be updated to be the current version of that claim.

In one embodiment, as described above, the claims system 100 can populate the claim version name field with the appropriate information for each claim version. To do so, when a customer-submitted claim is received, the claims system 100 can determine what name should populate the claim version name field. To do so, the claims system 100 can determine whether any related claims are currently being stored for the corresponding external claim identifier. For instance, when the claims system 100 receives a customer-submitted claim with an external claim identifier of 111098467234, the claims system 100 can determine whether any claims exist with an external claim identifier of 111098467234. If a claim exists with the external claim identifier of 111098467234, the claims system 100 can appropriately populate the claim version name field with replaced customer-submitted claim, revised customer-submitted claim, or reversed customer-submitted claim. In another embodiment, for claim versions received via a paid workflow, the claims system 100 can populate the claim version name field with paid customer-submitted claim.

In one embodiment, each of these customer-submitted claim versions uses a common external claim identifier to link these versions of the claim. This allows the claims system 100 to maintain the corresponding relationships of the claim's life cycle. It should be noted, however, that related internal claim identifier field is not populated for customer-submitted claims. Rather, the related internal claim identifier field is optionally populated when the claims system 100 processes an existing claim version. As described above, when an existing claim version is processed, the claims system 100 populates the related internal claim identifier field with the internal claim identifier of the previous claim version that was processed and updates the current claim field.

Continuing with above example, FIG. 6 shows two claims: claim 111098467234 and claim PROF01. Claim 111098467234 has a total of 11 versions—four of which are customer-submitted and seven of which are internal versions. The customer-submitted versions are the records assigned internal claim identifiers ACF4203, ACF5954, ACF6112, and ACF6452. FIG. 6 also shows the records associated with different processed versions (and their linkage) to these customer-submitted versions of the claim. As also shown in FIG. 6, the record assigned internal claim identifier ACF6185 for claim 111098467234 is the current claim. In other words, it is the most-recent version of claim 111098467234.

Claim PROF01, on the other hand, has a total of 2 versions—one of which is customer-submitted version. As previously described, the customer-submitted version is assigned internal claim identifier BXW6894, and the processed version of that claim is assigned internal claim identifier BXW6895. The record assigned internal claim identifier BXW6895 is also indicated as the current claim.

4. Display and Navigation of Claim Versions

Figure 9:
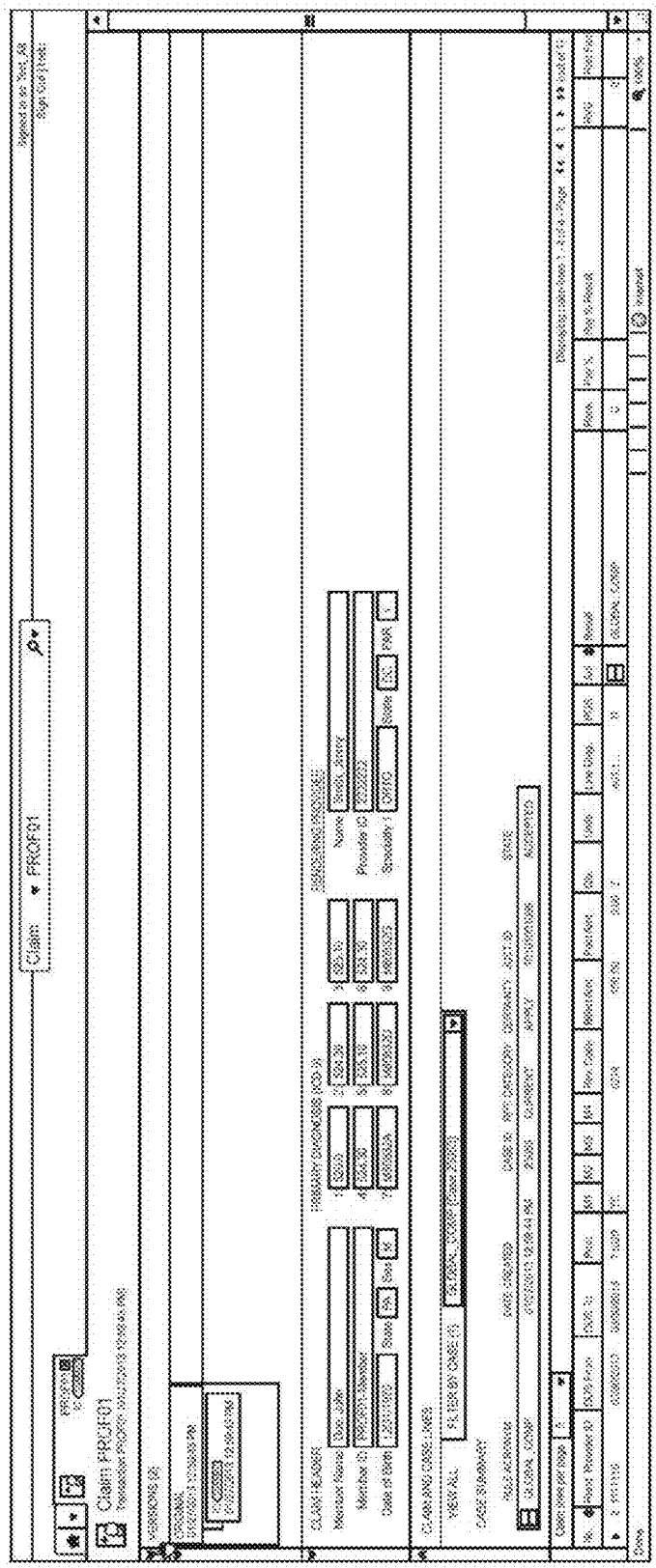
Figure 11:
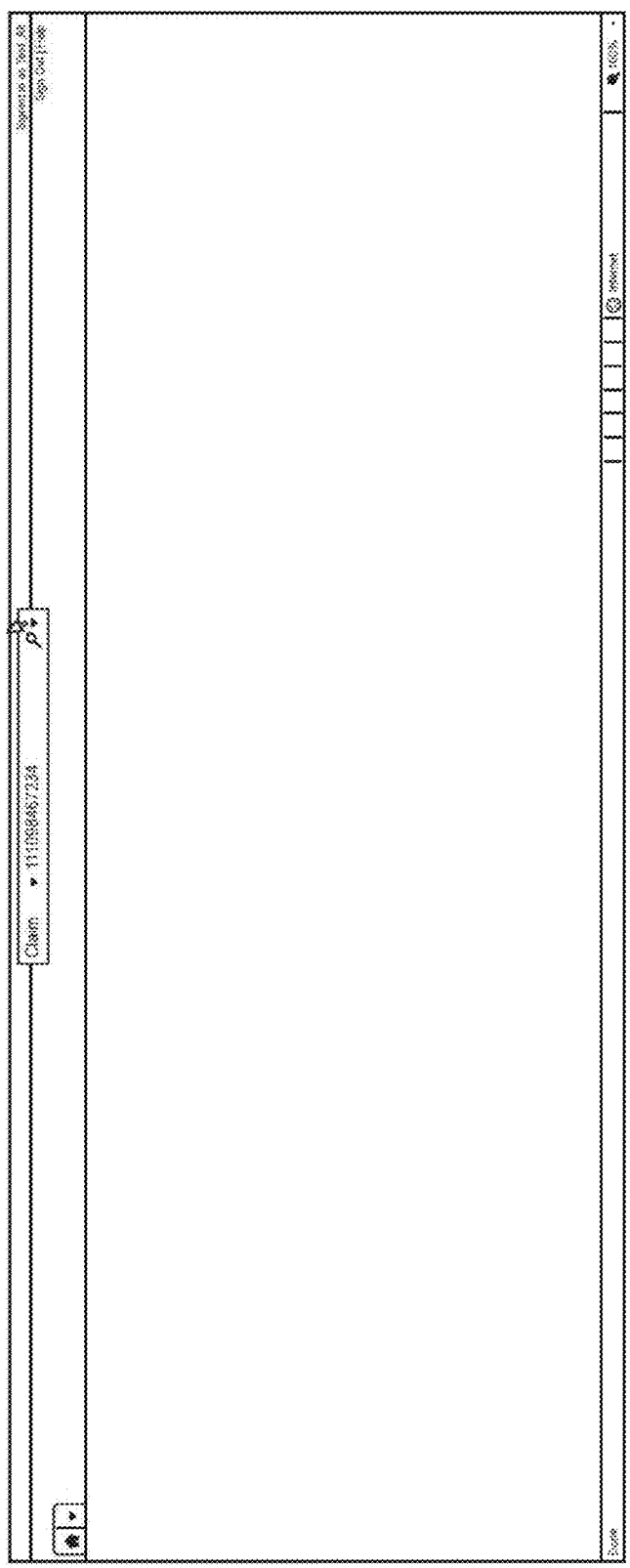
Figure 12:
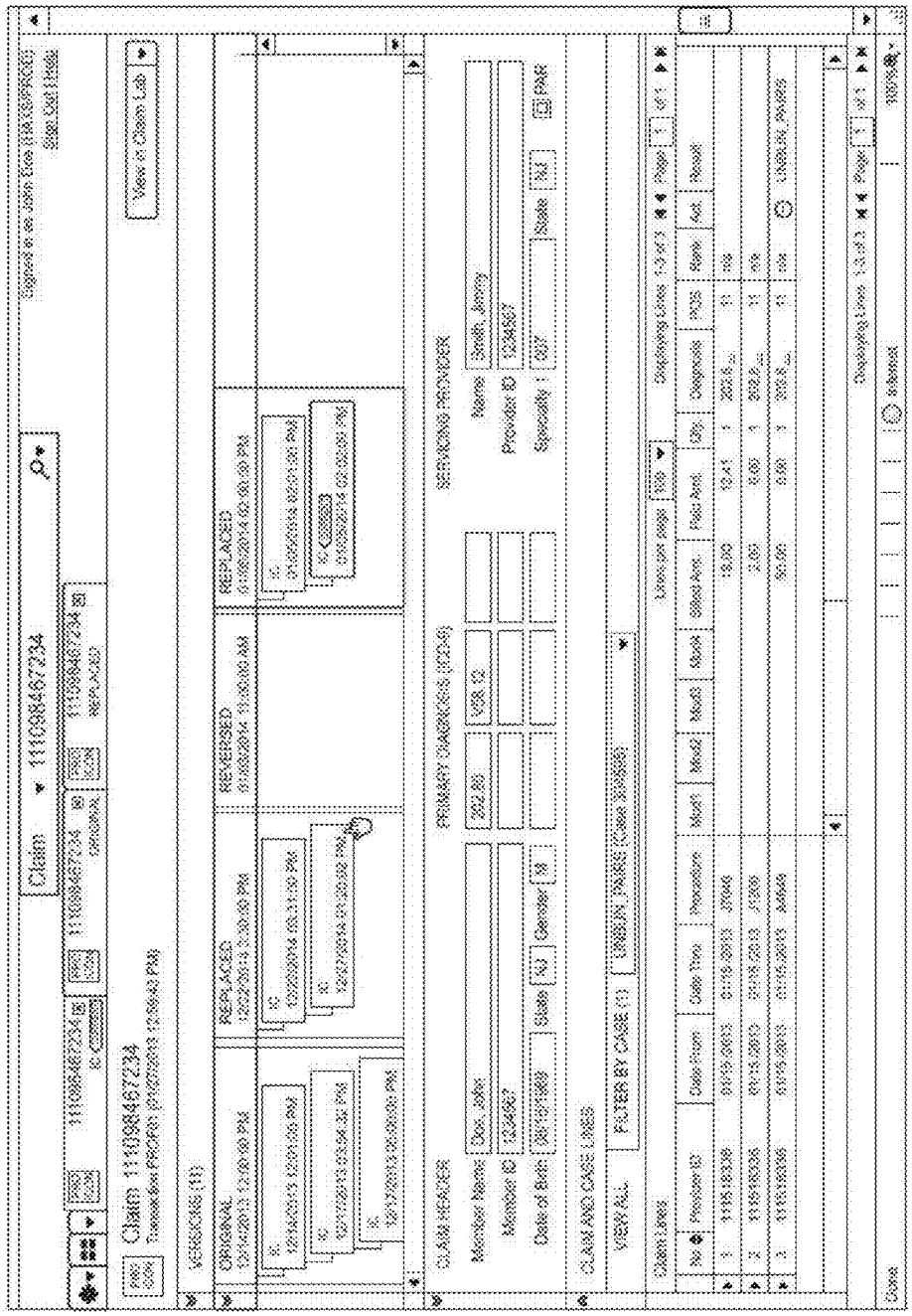

In one embodiment, using the information from the records of the various claim versions, the claims system 100 can cause display (e.g., via displaying module 250) of the claim versions in a graphical format, display, representation, and/or similar words used herein interchangeably, such as shown FIGS. 9 and 12. The graphical format may include a variety of information and formats including textual information, linked lists, tree formats, circular information (e.g., concentric circles), hierarchical information, tabular format, a combination thereof, and/or the like. For example, a customer (e.g., operating a customer computing entity 110) may access the claims system 100 and request information associated with a particular claim (see FIGS. 7 and 11). In response to such a request, the claims system 100 can cause display of information corresponding to the appropriate claim and claim versions. For example, the claims system 100 can cause display of the number of claim versions in an expanded or reduced view of a claim version panel of an interface (e.g., tab or window of an application including a browser). The claims system 100 can also cause display of expanded or reduced views of various other panels with information described above. Such panels may include a claim header panel, a claim line panel, and/or the like. In one embodiment, as a default setting, such information may be displayed for the current version of a claim, as indicated by the current claim field in the records for a given claim.

Figure 7:
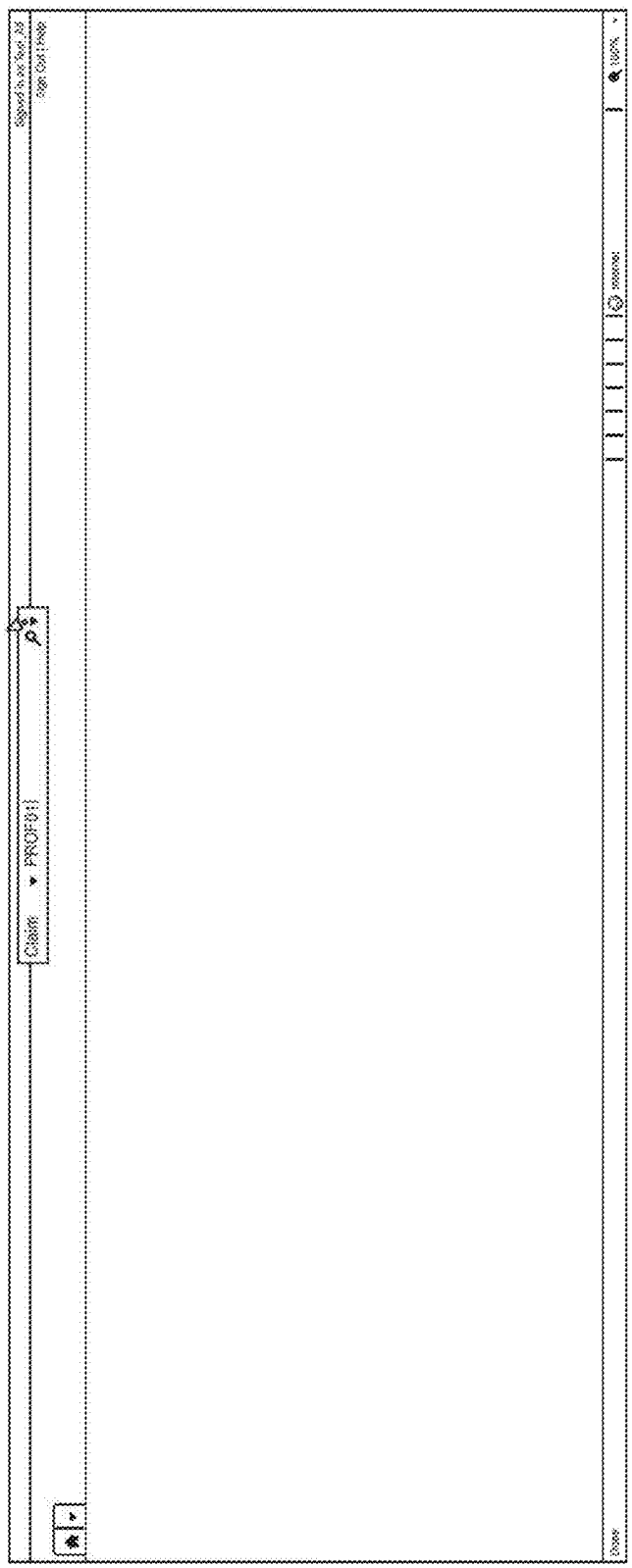
Figure 8:
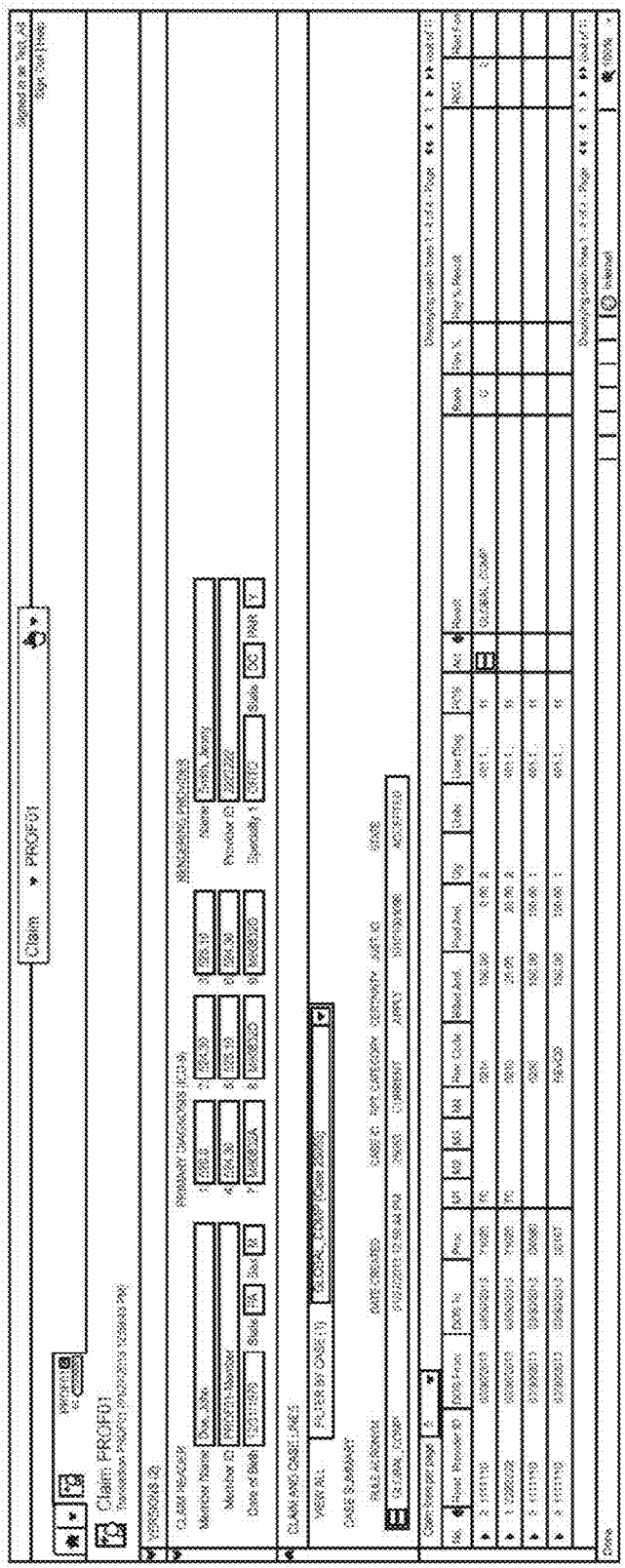

By way of example, as shown in FIG. 7, a customer (e.g., operating a customer computing entity 110) may access the claims system 100 and request information associated with claim PROF01. In response to such a request, the claims system 100 may query the database for all claim records associated with external claim identifier PROF01. In this example, the query of the database will return two records: the record assigned internal claim identifier BXW6894 and the record assigned internal claim identifier BXW6895. Because two records are returned in response to the query, the claims systems 100 can determine that there are two claim versions for claim PROF01. The claims system 100 can then cause display of an indication that the claim has two versions, such as causing display of "VERSIONS (2)" in the claim version panel (see FIGS. 8-10). As shown in FIG. 8, the claims system 100 can also cause display of information corresponding to the claim in the claim header panel, the claim line panel, and/or the like. As indicated, the claims system 100 may default to causing display of such information for the current version of the claim, which in this example corresponds to the record assigned internal claim identifier BXW6895.

In one embodiment, a customer (e.g., operating a customer computing entity 110) can initiate expansion of the claim version panel. In response to such a request, the claims system 100 can cause display in a graphical format (e.g., textual, circular, hierarchical, etc.) of the different claim versions for the corresponding claim. In the above example, as shown in the claim version panel of FIG. 9, the claims system 100 can cause display of a relationship graphically of the different versions of claim PROF01. To do so, the claims system 100 can cause display of at least a portion of each customer-submitted claim in a separate column. For example, the claims system 100 can identify all customer-submitted claims that were returned in the query—based on the claim version name field for instance. Then, the claims system 100 can order the different customer-submitted claims in order from left to right, right to left, and/or the like based on their time stamps. In such an embodiment, the customer-submitted claim with the earliest time stamp would be in the left-most column, and the customer-submitted claim with the latest time stamp would be in the right-most column. In the above example, because there is only one customer-submitted claim, the claims system 100 creates/generates a single column for the different claim versions.

Additionally, the claims system 100 can also cause display of any versions corresponding to each customer-submitted claim in the respective columns. To do so, for each customer-submitted claim, the claims system 100 can query the database to determine whether the related internal claim identifier field of any record has as its value the internal claim identifier of the corresponding customer-submitted claim. In this example, the claims system 100 queries whether the related internal claim identifier field of any record has BXW6894 as its value. In this case, because the record assigned internal claim identifier BXW6895 has BXW6894 as its value in the related internal claim identifier field, the query returns the record associated with internal claim identifier BXW6895. The claims system 100 can then query whether the related internal claim identifier field of any record has BXW6895 as its value. In this case, because the record assigned internal claim identifier BXW6895 is the last version of claim PROF01, the query does not return any results. Then, the claims system 100 can organize the claim assigned internal claim identifier BXW6895 in graphical relation (e.g., textual, circular, hierarchical, etc.) to the corresponding customer-submitted claim (see the claim version panel of FIG. 9). The claims system 100 can then cause display of the relationship graphically and cause display of at least a portion of each claim version (e.g., date and time stamp information). This approach provides the customer with display in a graphical format (e.g., textual, circular, hierarchical, etc.) of claim versions, such as shown in FIG. 9.

Figure 10:
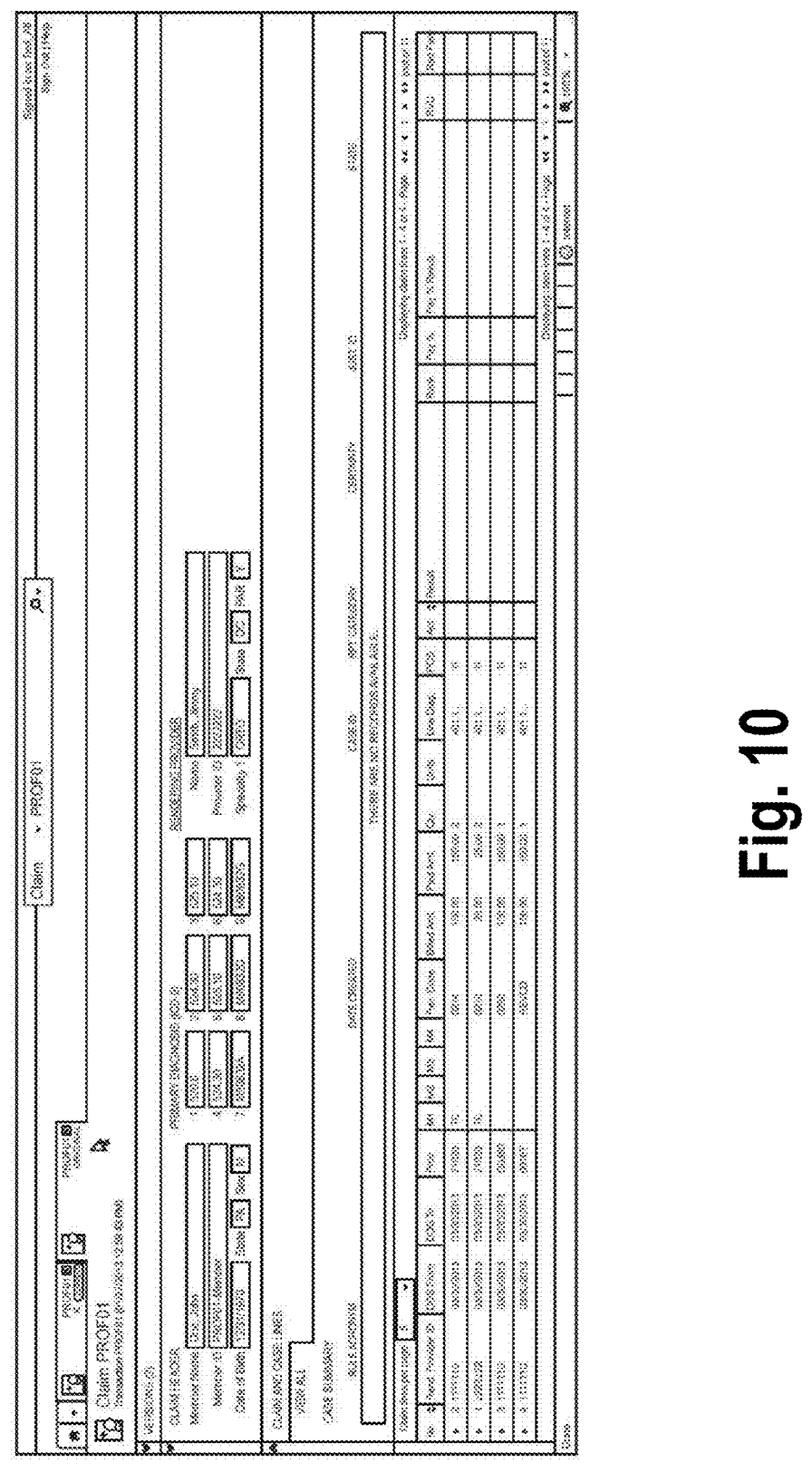

In one embodiment, as shown in FIGS. 10 and 12, each claim version can be opened in a tab, opened in a window, and/or the like in response to a customer request (e.g., via a customer operating a customer computing entity 110). For instance, each version of a claim in the graphical format/display can be selected to be opened in a tab, window, and/or the like to view information about the claim version. Once opened, the corresponding tab or window may include information to provide the user with an indication as to which claim version is being displayed in the window or tab, for instance (see the tabs in FIGS. 8-9 and 12-14). Further, although not shown in the figures, the claims system 100 can change the graphical format/display to indicate which claim version is being displayed via the window or tab. For example, a portion of the claim version in the graphical format/display can be bolded, highlighted, outlined, greyed-out, and/or the like to indicate which claim version is being displayed via the current tab or window. Further, as shown in FIG. 8, the claims system 100 can also cause display of an identifier via the interface (e.g., window or tab) indicating which claim version is the current version of the claim using the values in the current claim field. For example, the claims system 100 can cause display of a visual indication (e.g., superimpose a tag/icon on the current claim) in the graphical format/display (e.g., textual, circular, hierarchical, etc.), the tab, or window. The tag/icon may read "Current" and be colored, bolded, outlined, and/or the like for identification purposes. As another example, the indication could also be as simple as the current claim field name with the associated value of Y or N being displayed.

Continuing with another example, as shown in FIG. 11, a customer (e.g., operating a customer computing entity 110) may access the claims system 100 and request information associated with claim 111098467234. In response to such a request, the claims system 100 may query the database for all claim records associated with external claim identifier 111098467234. In this example, the query of the database will return 11 records: the records assigned internal claim identifiers ACF4203, ACF4204, ACF4985, ACF5001, ACF5954, ACF5955, ACF6007, ACF6112, ACF6452, ACF6184, and ACF6185. Because 11 records are returned in response to the query, the claims systems 100 can determine that there are 11 claim versions for claim 111098467234. The claims system 100 can then cause display of an indication that the claim has 11 versions, such as causing display of "VERSIONS (11)" in the claim version panel (see FIG. 12). As previously described, the claims system 100 may default to causing display of information for the current version of claim 111098467234, which in this example corresponds to the record assigned internal claim identifier ACF6185.

In one embodiment, as described, the claims system 100 can cause display in a graphical format (e.g., textual, circular, hierarchical, etc.) of the different claim versions for claim 111098467234. For example, the claims system 100 can cause display of at least a portion of each customer-submitted claim in a separate column. To do so, the claims system 100 can identify all customer-submitted claims that were returned in the query—based on the claim version name field for instance. Then, the claims system 100 can order the different customer-submitted claims in columns in order from left to right based on their time stamps. In such an embodiment, the customer-submitted claim with the earliest time stamp would be in the left-most column, and the customer-submitted claim with the latest time stamp would be in the right-most column. In this example, there are four customer-submitted claims. Thus, the claims system 100 can order the four customer-submitted claims in four columns (see FIG. 12).

Further, the claims system 100 can also cause display of any versions corresponding to each customer-submitted claim in the respective columns. To do so, for each customer-submitted claim, the claims system 100 can query the database to determine whether the related internal claim identifier field of any record has as its value the internal claim identifier of the corresponding customer-submitted claim. In this example, the claims system 100 queries whether the related internal claim identifier field of any record has ACF4203 as its value (the internal claim identifier value of the first customer-submitted claim). In this case, because the record assigned internal claim identifier has ACF4204 has ACF4203 as its value in the related internal claim identifier field, the query returns the record associated with internal claim identifier ACF4204. Then, the claims system 100 can query whether the related internal claim identifier field of any record has ACF4204 as its value. In this case, because the record assigned internal claim identifier has ACF4985 has ACF4204 as its value in the related internal claim identifier field, the query returns the record associated with internal claim identifier ACF4985. The claims system 100 can continue this recursive process until the last record associated with the customer-submitted claim is identified. This allows all versions of a customer-submitted claim to be organized in a graphical format (e.g., textual, circular, hierarchical, etc.) in a single column. As another example, the indication could also be as simple as the current claim field name with the associated value of Y or N being displayed.

In one embodiment, the claims system 100 can then perform the same process for the customer-submitted claim to be displayed in the second column—the second customer-submitted claim based on the time stamps for claim 111098467234. For example, the claims system 100 can query whether the related internal claim identifier field of any record has ACF5954 as its value (the internal claim identifier value of the second customer-submitted claim). In this case, because the record assigned internal claim identifier has ACF5955 has ACF5954 as its value in the related internal claim identifier field, the query returns the record associated with internal claim identifier ACF5955. Then, the claims system 100 can query whether the related internal claim identifier field of any record has ACF5955 as its value. In this case, because the record assigned internal claim identifier has ACF6007 has ACF5955 as its value in the related internal claim identifier field, the query returns the record associated with internal claim identifier ACF6007. The claims system 100 can continue this recursive process until the last record associated with the customer-submitted claim is identified. Further, the claims system 100 can continue this process for each customer-submitted version of claim 111098467234. The claims system 100 can then organize the claim versions in a relationship graphically and cause display of the same (see FIG. 12).

For each version, the claims system 100 can cause display of important date and time information related to each version at a quick glance. For example, the columns and rows in FIGS. 9, 10, and 12 show the claim name and the date and time the corresponding record was created/generated. In various embodiments, this allows all customer-submitted claims and their respective versions to be displayed in corresponding columns and rows in a customer-friendly format.

In one embodiment, the claims system 100 may display claim versions for migrated claims as well. To do so, each claim version may have its own column since the related internal claim identifier field may not be populated for migrated data. In such an example, display in the graphical format may have both customer-submitted claim versions at the tops of columns and internal versions at the tops of columns—there would be no related versions displayed in those columns. In this example, it would not be until or unless the claims system 100 creates a new internal version that the relationships would be established and could be visible as described above. In yet another example, if the related internal claim identifier field was not known when a claim was processed, for example, but populated later upon an upgrade or adoption of the claims system's 100 functionality, the related internal claim identifier field may be populated using custom business logic. Once populated, the claims system 100 can use the field to display such information as described above. Further, a visual indication may also be displayed to indicate that the claim versions being displayed are from migrated data.

As shown in FIG. 12 and previously discussed, claim versions can be opened in tabs, windows, and/or the like in response to a customer request (e.g., via a customer operating a customer computing entity 110). Further, for each claim version opened in a tab or window, the claims system 100 can cause display of a visual indication in the graphical format (e.g., textual, circular, hierarchical, etc.) as to which claim version is being displayed in the tab or window. For example, a portion of the claim version in the graphical format/display can be bolded, highlighted, outlined, greyed-out, and/or the like to indicate which claim version is being displayed via the current tab or window. Further, as shown in FIG. 12, the claims system 100 can also cause display of an identifier via the interface (e.g., window or tab) indicating which claim version is the most-recent version or the current version of the claim using the values in the current claim field. For example, the claims system 100 can cause display of a visual indication (e.g., superimpose a tag/icon on the current claim) in the graphical format/display (e.g., textual, circular, hierarchical, etc.), the tab, or window. The tag/icon may read "Current" and be colored, bolded, outlined, and/or the like for identification purposes. As another example, the indication could also be as simple as the current claim field name with the associated value of Y or N being displayed.

Figure 13:
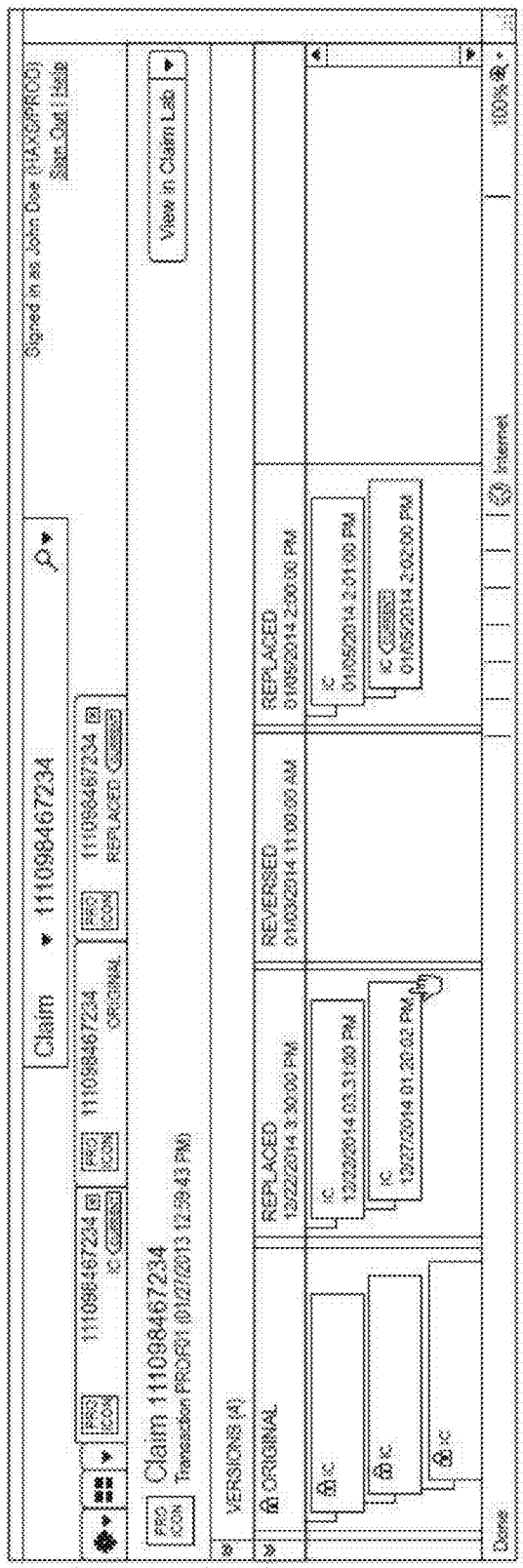
Figure 14:
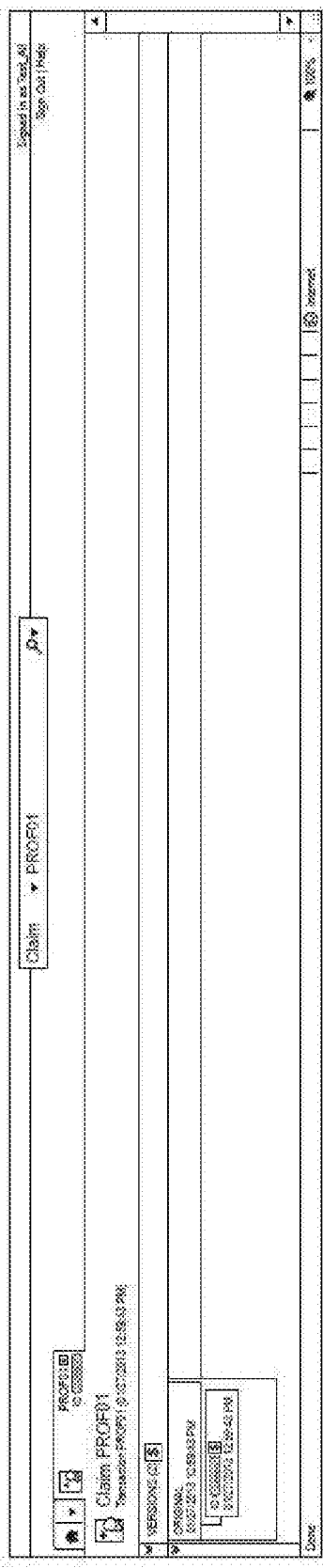

As indicated above, in one embodiment, each claim version can be opened in a tab, opened in a window, and/or otherwise navigated in response to a customer request (e.g., via a customer operating a customer computing entity 110). However, in certain embodiments, it may be desirable to prevent a claim or a claim version from being accessed by certain parties. For example, it may be desirable to prevent employees from viewing claim information of specific coworkers or all coworkers. To do so, the claims system 100 can prevent (e.g., lock out) certain users (e.g., based on their user profiles) from viewing information about specific people, claims, claim versions, and/or the like. Thus, the claims system 100 may not display specific types of information about certain people, claims, claim versions, and/or the like based on user profiles accessing the information. That is, the claims system 100 can filter (not include) or mask (include but identifying fields are masked or not visible, typically using a masking character like "#") for locked people, claims, and/or claim versions. Additionally, as shown in FIG. 13, the claims system 100 can cause display in the graphical format (e.g., textual, circular, hierarchical, etc.) of an indication that a claim version or a claim has been locked—such as the tag/icon shown in FIG. 13. As will be recognized, a variety of other approaches and techniques can also be used to adapt to various needs and circumstances.

In one embodiment, the claims system 100 can also indicate what actions, for example, were performed on/for a given claim version. Such actions may include pricing, scoring, auditing, bundling, and/or the like. For instance, when the claims system 100 creates/generates a recommendation to pay a line of a claim, the claims system 100 can price the line in accordance with the appropriate contracts, fee schedules, etc. After pricing a line or claim, the claims system 100 can populate a pricing field in the corresponding record for the claim with a "Y" to indicate that the line or claim version has been priced. This allows the claims system 100 to cause display in the graphical format/display (e.g., textual, circular, hierarchical, etc.) of an indication that a line, a claim version, or a claim has been priced—such as the tag/icon shown in FIG. 14. As will be recognized, a variety of other approaches and techniques can also be used to adapt to various needs and circumstances, such as for claim scoring, auditing, bundling, and/or the like.

In various embodiments, the described approaches and techniques allow for more effective and efficient research of a claim and understanding of the life of a claim. As will be recognized, various other techniques and approaches can be used to adapt to different needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for viewing claim versions, the method comprising:
   receiving, via one or more processors, a claim;
   storing, via the one or more processors, the claim (a) as a first version of the claim, (b) in association with a date and a time, (c) in association with an external claim identifier, and (d) in association with a first internal claim identifier corresponding to the first version of the claim;
   processing, via the one or more processors, the claim in accordance with one or more claims processing rules;
   storing, via the one or more processors, the processed first version of the claim as a second version of the claim, wherein the second version of the claim is stored in association with (a) a date and a time the first version of the claim was processed, (b) the external claim identifier, (c) the first internal claim identifier corresponding to the first version of the claim, and (d) a second internal claim identifier corresponding to the second version of the claim; and
   causing display (a) of at least a portion of the first version of the claim, (b) of at least a portion of the second version of the claim, and (c) the relationship between the first version of the claim and the second version of the claim in a graphical format based at least in part on the first internal claim identifier.

2. The method of claim 1, wherein the graphical format is selected from the group consisting of a hierarchical format, a circular format, and tabular format.

3. The method of claim 1 further comprising indicating the second version of the claim as the current version of the claim.

4. The method of claim 1 further comprising:
   receiving a third version of the claim; and
   storing the third version of the claim in association with (a) a date and a time, (b) the external claim identifier, and (c) a third internal claim identifier corresponding to the third version of the claim.

5. The method of claim 4 further comprising indicating the third version of the claim as the current version of the claim.

6. The method of claim 5 further comprising causing display (a) of at least a portion of the first version of the claim, (b) of at least a portion of the second version of the claim, (c) of at least a portion of the third version of the claim, and (d) the relationship between the first version of the claim, the second version of the claim, and the third version of the claim in a graphical format based at least in part on the first internal claim identifier and the second internal claim identifier.

7. The method of claim 6 further comprising:
receiving input requesting display of information associated with the second version of the claim; and
causing display of the information associated with the second version of the claim.

8. The method of claim 7, wherein the graphical format indicates that the information associated with the second version of the claim is being displayed.

9. The method of claim 1 further comprising populating a claim version name field for the first version of the claim.

10. The method of claim 1 further comprising:
determining a total number of claim versions associated with the external claim identifier; and
causing display of the total number of claim versions associated with the external claim identifier.

11. The method of claim 1 further comprising causing display of an indication that the first version of the claim is locked.

12. The method of claim 1 further comprising causing display of an indication that a specific action has been performed for the claim.

13. A computer program product for viewing claim versions, the computer program product comprising at least one non-transitory computer-readable storage medium having computer-readable program code portions stored therein, the computer-readable program code portions comprising:
an executable portion configured to receive a claim;
an executable portion configured to store the claim (a) as a first version of the claim, (b) in association with a date and a time, (c) in association with an external claim identifier, and (d) in association with a first internal claim identifier corresponding to the first version of the claim;
an executable portion configured to process the claim in accordance with one or more claims processing rules;
an executable portion configured to store the processed first version of the claim as a second version of the claim, wherein the second version of the claim is stored in association with (a) a date and a time the first version of the claim was processed, (b) the external claim identifier, (c) the first internal claim identifier corresponding to the first version of the claim, and (d) a second internal claim identifier corresponding to the second version of the claim; and
an executable portion configured to cause display (a) of at least a portion of the first version of the claim, (b) of at least a portion of the second version of the claim, and (c) the relationship between the first version of the claim and the second version of the claim in a graphical format based at least in part on the first internal claim identifier.

14. The computer program product of claim 13, wherein the graphical format is selected from the group consisting of a hierarchical format, a circular format, and tabular format.

15. The computer program product of claim 13 further comprising an executable portion configured to indicate the second version of the claim as the current version of the claim.

16. The computer program product of claim 13 further comprising:
an executable portion configured to receive a third version of the claim; and
an executable portion configured to store the third version of the claim in association with (a) a date and a time, (b) the external claim identifier, and (c) a third internal claim identifier corresponding to the third version of the claim.

17. The computer program product of claim 16 further comprising an executable portion configured to indicate the third version of the claim as the current version of the claim.

18. The computer program product of claim 17 further comprising an executable portion configured to cause display (a) of at least a portion of the first version of the claim, (b) of at least a portion of the second version of the claim, (c) of at least a portion of the third version of the claim, and (d) the relationship between the first version of the claim, the second version of the claim, and the third version of the claim in a graphical format based at least in part on the first internal claim identifier and the second internal claim identifier.

19. The computer program product of claim 18 further comprising:
an executable portion configured to receive input requesting display of information associated with the second version of the claim; and
an executable portion configured to cause display of the information associated with the second version of the claim.

20. The computer program product of claim 19, wherein the graphical format indicates that the information associated with the second version of the claim is being displayed.

21. The computer program product of claim 13 further comprising an executable portion configured to populate a claim version name field for the first version of the claim.

22. The computer program product of claim 13 further comprising:
an executable portion configured to determine a total number of claim versions associated with the external claim identifier; and
an executable portion configured to cause display of the total number of claim versions associated with the external claim identifier.

23. The computer program product of claim 13 further comprising an executable portion configured to cause display of an indication that the first version of the claim is locked.

24. The computer program product of claim 13 further comprising an executable portion configured to cause display of an indication that a specific action has been performed for the claim.

25. An apparatus comprising at least one processor and at least one memory including computer program code, the at least one memory and the computer program code configured to, with the processor, cause the apparatus to at least:
receive a claim;
store the claim (a) as a first version of the claim, (b) in association with a date and a time, (c) in association with an external claim identifier, and (d) in association with a first internal claim identifier corresponding to the first version of the claim;
process the claim in accordance with one or more claims processing rules;
store the processed first version of the claim as a second version of the claim, wherein the second version of the claim is stored in association with (a) a date and a time the first version of the claim was processed, (b) the external claim identifier, (c) the first internal claim identifier corresponding to the first version of the claim, and (d) a second internal claim identifier corresponding to the second version of the claim; and
cause display (a) of at least a portion of the first version of the claim, (b) of at least a portion of the second version of the claim, and (c) the relationship between the first version of the claim and the second version of the claim in a graphical format based at least in part on the first internal claim identifier.

26. The apparatus of claim 25, wherein the graphical format is selected from the group consisting of a hierarchical format, a circular format, and tabular format.

27. The apparatus of claim 25, wherein the memory and computer program code are further configured to, with the processor, cause the apparatus to indicate the second version of the claim as the current version of the claim.

28. The apparatus of claim 25, wherein the memory and computer program code are further configured to, with the processor, cause the apparatus to:
receive a third version of the claim; and
store the third version of the claim in association with (a) a date and a time, (b) the external claim identifier, and (c) a third internal claim identifier corresponding to the third version of the claim.

29. The apparatus of claim 28, wherein the memory and computer program code are further configured to, with the processor, cause the apparatus to indicate the third version of the claim as the current version of the claim.

30. The apparatus of claim 29, wherein the memory and computer program code are further configured to, with the processor, cause the apparatus to cause display (a) of at least a portion of the first version of the claim, (b) of at least a portion of the second version of the claim, (c) of at least a portion of the third version of the claim, and (d) the relationship between the first version of the claim, the second version of the claim, and the third version of the claim in a graphical format based at least in part on the first internal claim identifier and the second internal claim identifier.

31. The apparatus of claim 30, wherein the memory and computer program code are further configured to, with the processor, cause the apparatus to:
receive input requesting display of information associated with the second version of the claim; and
cause display of the information associated with the second version of the claim.

32. The apparatus of claim 31, wherein the graphical format indicates that the information associated with the second version of the claim is being displayed.

33. The apparatus of claim 25, wherein the memory and computer program code are further configured to, with the processor, cause the apparatus to populate a claim version name field for the first version of the claim.

34. The apparatus of claim 25, wherein the memory and computer program code are further configured to, with the processor, cause the apparatus to:
determine a total number of claim versions associated with the external claim identifier; and
cause display of the total number of claim versions associated with the external claim identifier.

35. The apparatus of claim 25, wherein the memory and computer program code are further configured to, with the processor, cause the apparatus to cause display of an indication that the first version of the claim is locked.

36. The apparatus of claim 25, wherein the memory and computer program code are further configured to, with the processor, cause the apparatus to cause display of an indication that a specific action has been performed for the claim.

* * * * *